United States Patent [19]

Moore, Jr.

[11] 4,352,229

[45] Oct. 5, 1982

[54] BEARING RETAINING AND POSITIONING MEANS

[75] Inventor: Edward A. Moore, Jr., Valparaiso, Ind.

[73] Assignee: Bethlehem Steel Corporation, Bethlehem, Pa.

[21] Appl. No.: 188,415

[22] Filed: Sep. 18, 1980

[51] Int. Cl.³ .......................................... F16C 35/078
[52] U.S. Cl. ............................ 29/116 R; 308/207 R; 308/236
[58] Field of Search ..................... 29/234, 116 R, 117, 29/129, 129.5; 308/59, 189 R, 236, 207 R

[56] References Cited

U.S. PATENT DOCUMENTS

| | | | |
|---|---|---|---|
| 2,245,084 | 6/1941 | Wood | 308/237 |
| 2,817,142 | 12/1957 | Boden et al. | 308/236 X |
| 2,957,393 | 10/1960 | Kampmeier | 308/236 X |
| 3,005,324 | 10/1961 | Zeller | 64/17 |
| 3,080,199 | 3/1963 | Rickley | 308/207 R |
| 3,304,139 | 2/1967 | Toth et al. | 308/236 X |
| 3,799,636 | 3/1974 | Kersting et al. | 308/207 R |

Primary Examiner—Eugene F. Desmond
Attorney, Agent, or Firm—Joseph J. O'Keefe; Michael J. Delaney

[57] ABSTRACT

An arrangement for retaining and positioning a tapered journal sleeve or bearing on the tapered journal of a rolling mill roll utilizes a circumferential groove in the cylindrical end of the roll, in which groove a number of cylindrical rollers are placed. The rollers have a diameter which is greater than the depth of the groove. Thus the rollers project outwardly from the groove and act as a stop for an extractor sleeve. Hydraulic fluid is used to force the tapered journal sleeve onto or off of the tapered journal of the rolling mill roll.

4 Claims, 5 Drawing Figures

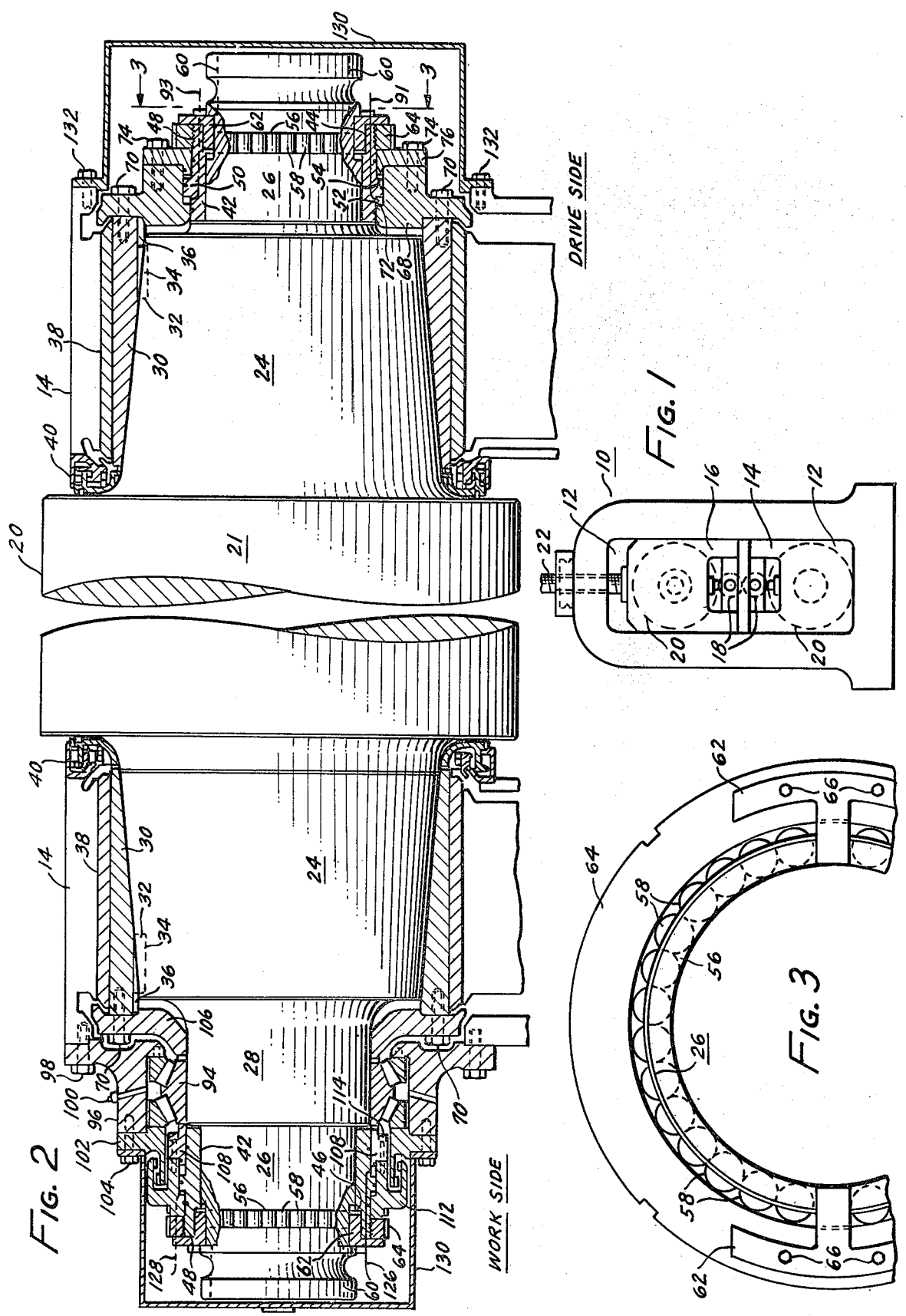

BEARING RETAINING AND POSITIONING MEANS

BACKGROUND OF THE INVENTION

Mills for rolling steel include large back-up rolls which support smaller rolls which are used to reduce the thickness of steel during a rolling operation. The back-up rolls may include tapered journal portions which mate with tapered journal sleeves which act as a bearing for the back-up rolls.

A number of prior art arrangements have been used to position a journal sleeve or bearing in place on a tapered journal. The prior art arrangements include a split clamp, a locking nut, locking plate, locking key and a bayonet type lock. However, due to the large forces during rolling which tend to drive the journal sleeve off the tapered roll journal, these prior art arrangements have not been completely satisfactory and on occasion have failed in service. Such failure can be costly due to breakdown of equipment and lost production time.

SUMMARY OF THE INVENTION

This invention relates generally to improved means for positioning a sleeve bearing or the like on a journal of a roll, and in particular to improved means for retaining a tapered journal sleeve on a tapered journal of a back-up roll of a rolling mill.

An object of this invention is to provide improved means for positioning a sleeve bearing on a roll journal which substantially reduces the chances of rolling forces causing the sleeve bearing to be forced off the roll journal.

Another object of this invention is to provide a simple and effective means to retain a bearing on a roll journal.

This invention accomplishes the above objects by employing a unique arrangement wherein cylindrical rollers act to transfer large rolling thrust forces safely to the roll. The rollers fit in a cylindrical groove near the end of the roll with the longitudinal axis of each roller parallel to the longitudinal axis of the roll. The rollers have a diameter substantially greater than the depth of the groove so that the rollers project outwardly from the groove and act as an abutment to maintain an extractor sleeve on the end of the roll. The extractor sleeve has a threaded out portion which is in threaded engagement with a locking nut which holds an extractor body and the journal sleeve in place on the roll.

BRIEF DESCRIPTION OF THE DRAWINGS

FIG. 1 is an elevation view of a mill stand of a rolling mill.

FIG. 2 is a view partly in cross-section of back-up roll and bearing member for the back-up roll.

FIG. 3 is a view partly broken taken along the line 3—3 of FIG. 2.

DETAILED DESCRIPTION OF THE DRAWINGS

Figure 4:
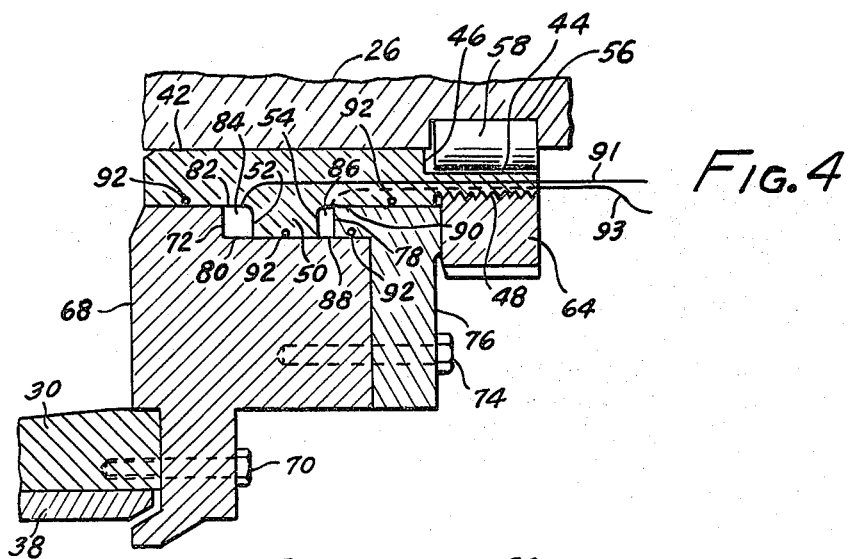
FIG. 4 is an enlarged partial view showing the hydraulic cavities on one end of a back-up roll.

Referring to FIG. 1, rolling mill housing 10 includes windows 12 for supporting and guiding blocks 14,16 in which work rolls 18 and back-up rolls 20 are journaled. Each end of work rolls 18 and back-up rolls 20 is journaled in a guide block which is positioned in a window 12. The lower blocks 14 for the bottom rolls lie at the bottom of window 12, and the upper blocks 16 for the upper rolls are slidably supported in windows 12. The vertical position of upper blocks 16 is determined by screwdowns 22 operated by conventional mechanism, not shown. The rolling mill is provided with upper and lower back-up rolls 20 of large diameter and work rolls 18 of a smaller diameter.

Referring to FIG. 2, back-up roll 20 includes a drive side and a work side. Back-up roll 20 has a center portion 21 of large diameter which is in contact with work roll 18 of FIG. 1, a tapered journal portion 24 adjacent both ends of center portion 21 and a reduced diameter cylindrical end portion 26 located at the ends of the back-up roll 20. The work side of the back-up roll 20 further includes a second cylindrical portion 28 having a diameter greater than the diameter of cylindrical portion 26 and less than the minimum diameter of tapered journal portion 24.

Referring to the drive side of back-up roll 20 shown in FIG. 2, tapered journal portion 24 has a tapered journal sleeve 30 positioned thereon. Key 32 which fits in a groove 34 in tapered journal portion 24 and also extends into a groove 36 in tapered journal sleeve 30 prevents tapered journal sleeve 30 from rotating independently of roll 20. Thus, tapered journal sleeve 30 rotates with the rotation of back-up roll 20. Surrounding journal sleeve 30 is a steel cadmium-lined bushing or bearing 38 which is fixed to guide block 14. During operation an oil film is provided between tapered journal sleeve 30 and bushing 38. Conventional sealing means 40 prevents dirt from contaminating the oil film and allows the oil film to be maintained. Such sealing means 40 is well known in the art and further description thereof is not required for an understanding of this invention.

As shown at the drive side of FIG. 2, an extractor sleeve 42 extends over cylindrical portion 26 with the inside surface of extractor sleeve 42 slidably mating with the outside surface of cylindrical portion 26. Extractor sleeve 42 has an enlarged bore 44 at its outer end forming an inside shoulder 46. The outer end of extractor sleeve 42 includes an externally threaded portion 48. About midway of the length of extractor sleeve 42 is an integral portion 50 having an enlarged diameter and a short length to form external shoulders 52,54.

As best shown in FIG. 3, extending circumferentially about cylindrical portion 26 is a groove 56 for the reception of cylindrical rollers 58. Cylindrical rollers 58 have a diameter such that the rollers extend outwardly from groove 56. Extending perpendicular to groove 56 are longitudinal grooves 60, shown in FIG. 2, to allow rollers 58 to be inserted in groove 56 while extractor sleeve 42 is positioned on cylindrical portion 26 of back-up roll 20. The longitudinal grooves 60 intersect groove 56; are spaced 180 degrees and have a depth equal to depth of circumferential groove 56. Referring to FIG. 3, to insure that rollers 58 do not fall out of groove 56 a locking key 62 is placed within each longitudinal groove 60 and extends into circumferential groove 56. Locking keys 62 are secured to adjusting nut 64 by fasteners 66 which are in threaded engagement with tapped holes in adjusting nut 64. Referring to FIG. 2, adjusting nut 64 is in threaded engagement with threaded portion 48 of extractor sleeve 42.

As shown in FIG. 2, an extractor body 68 is secured to tapered journal sleeve 30 by means of bolts 70 passing through holes in extractor body 68 and in threaded engagement with tapped holes in tapered journal sleeve 30. The inside diameter of extractor body 68 at one end is such as to provide sliding contact with the outside surface of the inside end of extractor sleeve 30. The inside diameter of extractor body 68 at its other end is such that it is in sliding contact with integral portion 50 of extractor sleeve 42. Thus extractor body 68 includes a shoulder 72 which is opposed to shoulder 52 an extractor sleeve 42. Secured to the outer end of extractor body 68 by bolts 74 is an extractor head 76 having an L-shaped cross section. The extractor head 76 is slidably mounted on extractor sleeve 42 and includes a shoulder portion 78 which is opposed to shoulder 54 on extractor sleeve 42.

The above arrangement of extractor sleeve 42, extractor body 68 and extractor head 76 provides for two hydraulic cavities. The first hydraulic cavity 84 is bounded by shoulder 72 of extractor body 68, an interior surface 80 of extractor body 68, shoulder 52 of extractor sleeve 42 and exterior surface 82 of extractor sleeve 42. A second hydraulic cavity 86 is bounded by shoulder 78 of extractor head 76, shoulder 54 of extractor sleeve 42, interior surface 88 of extractor body 68 and exterior surface 90 of extractor sleeve 42. O-rings 92 form hydraulic seals to maintain the integrity of hydraulic cavities 84 and 86.

Referring to FIG. 2, hydraulic fluid line 91 extends from outside of extractor sleeve 42 and through extractor sleeve 42 to hydraulic cavity 84. Hydraulic fluid line 93 extends from outside of extractor sleeve 42 and through extractor sleeve 42 to hydraulic cavity 86. The outside ends of hydraulic fluid lines 91 and 93 are provided with means (not shown) to apply hydraulic fluid through the lines 91,93 to the hydraulic cavities 84,86.

Referring to the work side of the back-up roll 20 shown in FIG. 2, the arrangement and relative positions of the extractor sleeve 42, rollers 58, circumferential groove 56, longitudinal grooves 60, locking key 62, adjusting nut 64, reduced cylindrical end portion 26, bushing 38, journal sleeve 30, key 32, sealing means 40 are as described above. The main difference in the arrangement between the thrust side and the drive side is the provision of a thrust bearing 94 which is in contact with second cylindrical portion 28. Thrust bearing 94 is mounted in thrust bearing housing 96 which is secured by fasteners 98 to guide block 14. Opening 100 allows thrust bearing 94 to be lubricated. Thrust bearing retainer 102 is secured to thrust bearing housing 96 by fastener 104 and retains thrust bearing 94 within thrust bearing housing 96.

Figure 5:
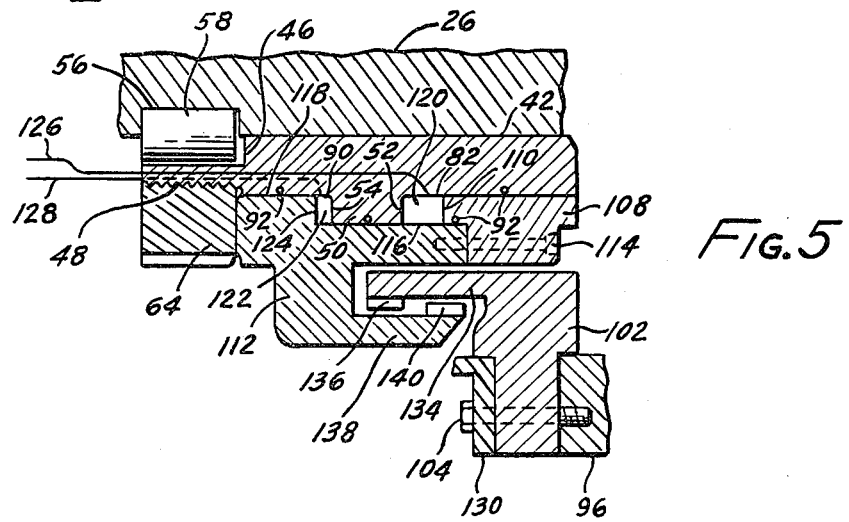
FIG. 5 is an enlarged partial view showing the hydraulic cavities on the other end of the back-up roll.

One end of thrust bearing 94 is in contact with end retainer 106 which is secured to tapered journal sleeve 30 by means of bolts 70. The other end of thrust bearing 94 contacts extractor retainer 108 which includes a shoulder portion 110 opposed to shoulder portion 52 on extractor sleeve 42, as shown in FIG. 5. Extractor retainer 108 is secured to extractor 112 by means of fastener 114. Extractor 112 has an inside surface 116 which is slidably mounted on integral portion 50 of extractor sleeve 42 and in addition has a shoulder 124 which is opposed to shoulder 54 of extractor sleeve 42. Extractor 112 also has a reduced inside diameter portion which includes a surface 118 which is slidably mounted on the extractor sleeve 42 adjacent threaded portion 48.

As described above for the drive side of the back-up roll 20, the work side also includes two hydraulic fluid cavities 120,122. As shown in FIG. 5, first hydraulic fluid cavity 120 is bounded by shoulder 110 of extractor retainer 108, shoulder 52 on extractor sleeve 42, exterior surface 82 of extractor sleeve 42 and inside surface 116 of extractor 112. Second hydraulic fluid cavity 122 is bounded by outside surface 90 of extractor sleeve 42, shoulder 54 of extractor sleeve 42, shoulder 124 of extractor 112 and inside surface 116 of extractor 112. O-rings 92 properly seal the hydraulic fluid cavities 120,122. Hydraulic fluid line 126 extends through extractor sleeve 42 to first hydraulic fluid cavity 120, and hydraulic fluid line 128 extends through extractor sleeve 42 to second hydraulic fluid cavity 122. Both hydraulic fluid lines 126,128 are provided with the proper means to allow hydraulic fluid under pressure to be admitted to the hydraulic fluid cavities 120,122. While both hydraulic fluid lines 126,128 are shown in FIG. 5, it should be understood that these lines may enter the hydraulic cavities 120,122 through the extractor sleeve 42 at any convenient location.

As shown in FIG. 5, thrust bearing retainer 102 includes a number of integral arm portions 134 each having an abutment 136 underlying the integral arm portions 138 of extractor 112 which have abutments 140 opposed to abutments 136.

Each end of back-up roll 20 is provided with an end cap 130. The cap 130 on the work side of the back-up roll 20 is connected to the thrust bearing housing 96 by bolts 104, while the cap 130 on the drive side of the back-up roll is connected to guide 14 by bolts 132.

OPERATION

The following is a description of the steps to be followed in securing the tapered journal sleeve 30 to the tapered journal portion 24 of the drive side of back-up roll 20:

1D. Extractor body 68 is secured to tapered journal sleeve 30 by means of bolts 70.

2D. Extractor sleeve 42 with O-rings 92 properly positioned is placed within extractor body 68.

3D. Extractor head 76 is secured to extractor body 68 by bolts 74.

4D. Adjusting nut 64 is placed in threaded engagement with threaded portion 48 of extractor sleeve 42.

5D. The above assembly of parts is then placed on roll 20 such that tapered journal sleeve 30 is positioned on tapered journal portion 24 of back-up roll 20 with key 32 properly positioned in grooves 34,36 in tapered journal 24 and tapered journal sleeve 30, respectively, and extractor sleeve 42 is positioned on cylindrical portion 26 of back-up roll 20.

6D. Rollers 58 are inserted by means of longitudinal groove 60 in back-up roll 20 into circumferential groove 56 so that rollers 58 fill the groove 46 except for a space for locking keys 62 and a locking key 62 is placed in each longitudinal groove 60 with locking keys 62 extending into circumferential groove 56.

7D. Hydraulic fluid under pressure is admitted to hydraulic fluid cavity 84 through hydraulic line 91 and the fluid pressure forces shoulder 46 of extractor sleeve 42 into contact with the ends of rollers 58. Since the rollers are secured in circumferential groove 56, the extractor sleeve 42 is now fixed in position. However, the fluid pressure in cavity 84 causes extractor body 68 to force tapered journal sleeve 30 onto tapered journal 24.

8D. Adjusting nut 64 is threaded onto threaded portion 48 of extractor sleeve 42 until the nut 64 is firmly in contact with extractor head 76 which is secured to extractor body 68. Bolts 66 are inserted to secure locking keys 62 to nut 64. The tapered journal sleeve 30 is now secured to tapered journal portion 24 of back-up roll 20, and any force tending to force the tapered sleeve off the tapered journal 24 is passed to the rollers 58 by way of extractor body 68, extractor head 76, adjusting nut 64, extractor sleeve 42 to rollers 58 to cylindrical end portion 26 of back-up roll 20.

The following is a description of the steps to be followed in securing the tapered journal sleeve 30 to the tapered journal portion 24 of the work side of back-up roll 20:

1W. End retainer 106 is secured to tapered journal sleeve 30 by means of bolts 70.

2W. Thrust bearing 94 is placed within thrust bearing housing 96.

3W. Extractor sleeve 42 with O-rings 92 properly in place is positioned within extractor retainer 108 which is connected to extractor 112 by fasteners 114. Extractor 112 is then positioned within thrust bearing retainer 102. It should be understood that extractor 112 can be rotated relative to thrust bearing retainer 102 so that abutments 140 on arms 138 pass by abutments 136 on arms 134.

4W. Adjusting nut 64 is placed in threaded engagement with threaded portion 48 of extractor sleeve 42.

5W. The above assembly of parts is the placed on roll 20 such that tapered journal sleeve 30 is positioned on tapered journal 24 of back-up roll 20 with key 32 properly positioned in grooves 34,36 in tapered journal 24 and tapered journal sleeve, respectively, thrust bearing 94 is positioned on cylindrical portion 28, thrust bearing housing 96 is fixed to guide 14 by fasteners 98, and extractor sleeve 42 is placed over reduced cylindrical end portion 26.

6W. Rollers 58 are inserted by means of longitudinal groove 60 in back-up roll 20 into circumferential groove 56 and a locking key 62 is placed in each longitudinal groove 60 with locking key 62 extending into circumferential groove 56, as described under 6D.

7W. Hydraulic fluid under pressure is admitted to hydraulic fluid cavity 120 through hydraulic line 126 and the fluid pressure forces shoulder 46 of extractor sleeve 42 into contact with the ends of rollers 58. Since rollers 58 are secured in circumferential groove 56, the extractor sleeve 42 is now fixed in position, i.e. no further movement of extractor sleeve 42 results from the fluid pressure. However, the fluid pressure in cavity 120 causes extractor retainer 108 to act against thrust bearing 94 and end retainer 106 to force tapered journal sleeve 30 onto tapered journal 24.

8W. Adjusting nut 64 is threaded onto threaded portion 48 of extractor sleeve 42 until the nut 64 is firmly in contact with extractor 112 which is secured to extractor retainer 108. Bolts 66 are inserted to secure locking keys 62 to nut 64. The tapered journal sleeve 30 is now secured to tapered journal portion 24 of back-up roll 20 and any force tending to force the tapered journal sleeve off the tapered journal portion 24 is passed to rollers 58 by way of end retainer 106, thrust bearing 94, extractor sleeve 42 to rollers 58 to cylindrical end portion 26 of back-up roll 20.

The following is a description of the stage to be followed in removing the tapered journal sleeve 30 from tapered journal portion 24 of the drive side of back-up roll 20:

AD. The fasteners 66 securing locking key 62 to adjusting nut 64 are removed and adjusting nut 64 is removed from threaded engagement with threaded portion 48 of extractor sleeve 42.

BD. Hydraulic fluid pressure is applied to fluid cavity 86 through hydraulic line 93. The fluid pressure causes the outside end of extractor sleeve 42 to move out of contact with the ends of rollers 58 and the inside end of extractor sleeve to bear against the shoulder between the reduced cylindrical portion 26 and tapered journal portion 24. The extractor sleeve 42 is now fixed in position, i.e. cannot move any distance as a result of the fluid pressure. However fluid pressure in cavity 86 causes a force to be exerted on extractor head 76, which force tends to drive extractor head off the end of the back-up roll 20. This force is passed to extractor body 68 through bolts 74 and to tapered journal sleeve 30 through bolts 70, thereby forcing tapered journal sleeve 30 free of tapered journal 24.

The following is a description of the steps to be followed in removing the tapered journal 30 from tapered journal 24 of the work side of back-up roll 20:

AW. The fasteners 66 securing locking keys 62 to adjusting nut 64 are removed and adjusting nut 64 is removed from threaded engagement with threaded portion 48 of extractor sleeve 42.

BW. Hydraulic fluid under pressure is passed through hydraulic line 128 to hydraulic cavity 122. The fluid pressure causes the extractor sleeve 42 to move out of contact with the ends of the rollers 58 and the end of the extractor sleeve to contact the shoulder on back-up roll 20 formed between cylindrical portions 26 and 28 of back-up roll 20. The extractor sleeve 42 is now fixed in position, i.e. cannot move as a result of the fluid pressure. However, the fluid pressure in cavity 122 causes a force to be exerted on shoulder of extractor 112 which force tends to drive extractor 112 off the back-up roll 20.

CW. A force is exerted on abutments 140 of extractor 112 through abutments 136 of thrust bearing retainer 102. This force is passed by bolts 98 to guide block 14 and guide block 14 moves into contact with end retainer 106 which through bolts 70 passes the force to tapered journal sleeve 30 to free tapered journal sleeve 30 from tapered journal 24.

Although I have described my invention in considerably detail, I do not wish to be limited narrowly to the exact and specific particulars disclosed, but I may also use such substitutes, modifications, combinations or equivalents as are included within the scope and spirit of the invention or pointed out in the appended claims.

I claim:

1. In combination with a roll having a tapered journal portion and a cylindrical end portion having a diameter less than said tapered journal portion, improved means to retain and position a journal sleeve relative to said tapered journal portion comprising:
   (a) a journal sleeve having an inside surface which has a taper about equal to the taper of said tapered journal portion,
   (b) an extractor sleeve slidably mounted on said cylindrical end portion,
   (c) a circumferential groove in said cylindrical end portion,
   (d) a plurality of rollers positioned in said circumferential groove, each roller having its longitudinal axis substantially parallel to the longitudinal axis of said roll and a diameter greater than the depth of said circumferential groove, (e) a longitudinal groove in said cylindrical end portion extending outwardly from said circumferential groove to allow said rollers and a locking key to be placed in and removed from said circumferential groove, (f) an extractor body attached to the outer end of said journal sleeve and having an inside surface which is slidably mounted on said extractor sleeve, and (g) a first hydraulic cavity between said extractor sleeve and said extractor body whereupon supplying hydraulic pressure to said first hydraulic cavity initially forces said extractor sleeve against the ends of said rollers and thereafter causes said extractor body to force said journal sleeve onto said tapered journal portion.

2. The improved means of claim 1 further including a second hydraulic cavity between said extractor sleeve, said extractor body and an extractor head slidably mounted on said extractor sleeve whereupon supplying hydraulic fluid to said second hydraulic cavity initially forces said extractor sleeve out of contact with the ends of said rollers and thereafter causes said extractor body and extractor head to force said journal sleeve out of contact with said tapered journal portion.

3. In combination with a roll having a tapered journal portion and a first cylindrical end portion having a tapered journal portion and a second cylindrical portion having a diameter intermediate the diameter of said first cylindrical end portion and the minimum diameter of said tapered journal portion, improved means to position and retain a journal sleeve relative to said tapered journal portion comprising:

(a) a journal sleeve having an inside surface which has a taper about equal to the taper of said tapered journal portion, (b) an extractor sleeve slidably mounted on said first cylindrical end portion, (c) a thrust bearing position on said second cylindrical end portion, (d) a circumferential groove in said first cylindrical end portion, (e) a plurality of rollers positioned in said circumferential groove each roller having its longitudinal axis substantially parallel to the longitudinal axis of said roll and a diameter greater than the depth of said circumferential groove, (f) a longitudinal groove in said first cylindrical end portion extending outwardly from said circumferential groove to allow said rollers and a locking key to be placed in and removed from said circumferential groove, (g) an end retainer attached to the outer end of said journal sleeve and in contact with one side of said thrust bearing, (h) an extractor having an inside surface slidably mounted on said extractor sleeve, (i) an extractor retainer having an inside surface slidably mounted on said extractor sleeve and in contact with the other side of said thrust bearing and secured to said extractor, and (j) a first hydraulic cavity between said extractor sleeve, said extractor and said extractor retainer whereupon supplying hydraulic pressure to said first hydraulic cavity initially forces said extractor sleeve against the ends of said rollers and thereafter causes said extractor retainer to apply a force to said journal sleeve through said thrust bearing and said end retainer.

4. The improved means of claim 3 further including a second hydraulic cavity between said extractor sleeve and said extractor whereupon supplying hydraulic pressure to said second hydraulic cavity initially forces said extractor sleeve out of contact with the ends of said rollers and thereafter causes said extractor to exert a force which is passed to said journal sleeve to force said journal sleeve out of contact with said tapered journal portion.

* * * * *